United States Patent [19]
Miyazaki

[11] Patent Number: 5,964,511
[45] Date of Patent: Oct. 12, 1999

[54] CONTROL METHOD FOR ANTILOCK BRAKING SYSTEMS WITH STRESS SENSOR

[75] Inventor: Nagao Miyazaki, Osaka, Japan

[73] Assignee: Japan Electronics Industry, Ltd., Osaka, Japan

[21] Appl. No.: 08/662,338

[22] Filed: Jun. 12, 1996

[51] Int. Cl.⁶ ................................................. G01M 19/00
[52] U.S. Cl. .......................... 303/191; 303/150; 303/112; 73/118.1; 73/862.66; 73/862.041; 73/862.628
[58] Field of Search ..................................... 303/146, 150, 303/155, 177, 191, 112, 113.1; 73/118.1, 862.66, 862.041, 862.628

[56] References Cited

U.S. PATENT DOCUMENTS 5,186,042  2/1993  Miyazaki ................................ 73/118.1

*Primary Examiner*—Peter M. Poon
*Attorney, Agent, or Firm*—Jones, Tullar & Cooper, P.C.

[57] ABSTRACT

An antilock braking system using stress sensors installed in the wheel axle of a motor vehicle. The stress sensors measure a road surface frictional force, a vertical load, a road surface friction coefficient, a braking torque, and a side force. An arithmetic calculator calculates a parameter value M from these measured values. An ABS controller controls movement process toward a braking pressure reduction mode in accordance with the change in the value M. Thereby, the system can preclude the locking of the wheel of the motor vehicle even when the brake is suddenly applied.

10 Claims, 4 Drawing Sheets

CONTROL METHOD FOR ANTILOCK BRAKING SYSTEMS WITH STRESS SENSOR

FIELD OF THE INVENTION

The present invention relates to a control method for antilock braking systems capable of precluding the locking of the wheels of a motor vehicle on sudden application of the brake and, more particularly, to a control method for a movement process toward a braking pressure reduction mode in antilock braking systems with stress sensors.

BACKGROUND OF THE INVENTION

If the wheels of a motor vehicle are locked upon application of the brake of the motor vehicle, rotation of the tire of the vehicle is braked, followed by tire slipping on the road surface.

Such a condition means less vehicle controllability. Antilock braking systems (ABS) are control systems capable of preventing the tires from locking during a braking process.

Generally the conventional antilock braking system for motor vehicles employs a system such that the braking action is automatically controlled in accordance with acceleration of the vehicle wheel. Acceleration speed of the vehicle wheel is determined by taking the derivative of wheel speed which is measured with the use of a wheel speed or wheel velocity sensor. This wheel velocity sensor has a structure measuring rotational velocity of the vehicle wheel by detecting the rotation speed of a geared hub attached on the axle of the wheel with the use of a magnetic pick-up. To minimize error due to dust that adheres on the surface of the geared hub there is a limitation for the fineness in tooth pitch. Consequently, measurement errors due to such wheel speed sensors can be safely ignored for high velocity rotation of the wheel, but for low velocity rotation of the wheel, measurement accuracy will deteriorate because a signal from the magnetic pick-up comes to have a longer input interval.

Control characteristics of motor vehicles with antilock braking systems operated by the measured values of acceleration of the vehicle wheel have a high possibility that controllability becomes unstable when the motor vehicle is traveling at a lower speed, since the measured values show deteriorated accuracy when the wheel is rotating at a lower velocity.

SUMMARY OF THE INVENTION

An object of the present invention is to provide a control method for antilock braking systems without using a measured value of acceleration of a vehicle wheel as a control parameter.

Another object of the present invention is to provide an optimum braking control method for antilock braking systems using as a control parameter the values measured by stress sensors installed in the wheel axle of the vehicle for control action.

A further object of the present invention is to provide a control method for antilock braking systems capable of maintaining stable operation even on the occasion of a sudden brake application during cornering.

A preferred embodiment according to the present invention is given in the following control method for antilock braking systems. The antilock braking systems comprise at least one stress sensor means, the control method comprises the steps of: measuring a measured value Fs of a road surface frictional force, a measured value Ns of a vertical load, a measured value $\mu$s of a road surface friction coefficient, and a measured value Ts of braking torque by using the stress sensor means; calculating a value M from the measured values Fs, Ns, $\mu$s and Ts; monitoring a change in the value M; and controlling a movement process toward a braking pressure reduction mode in accordance with the change in the value M; thereby the system can preclude the locking of the wheel of the motor vehicle upon sudden application of the brake.

These and other advantages and objects of the present invention will be apparent upon reference to the following detailed description taken in connection with the attached drawings.

DESCRIPTION OF THE PREFERRED EMBODIMENTS

Preferred embodiments according to the present invention will be described hereinafter. Other embodiments will be apparent upon reference to the following detailed description.

An embodiment of a control method for a movement process toward a braking pressure reduction mode in antilock braking systems with stress sensors according to the present invention will now be described.

In this embodiment, the stress sensor is a device which can produce output values used for control operation. The output values are the measured values of a road surface frictional force F, a vertical load N, a road surface friction coefficient $\mu$, a braking torque T, and a side force S respectively, or the values proportional to F, N, $\mu$, T, and S respectively, designated as $F_s$, $N_s$, $\mu_s$, $T_s$ and $S_s$. It is known that such devices can be made with, for example, a strain gauge or equivalent.

Figure 1:
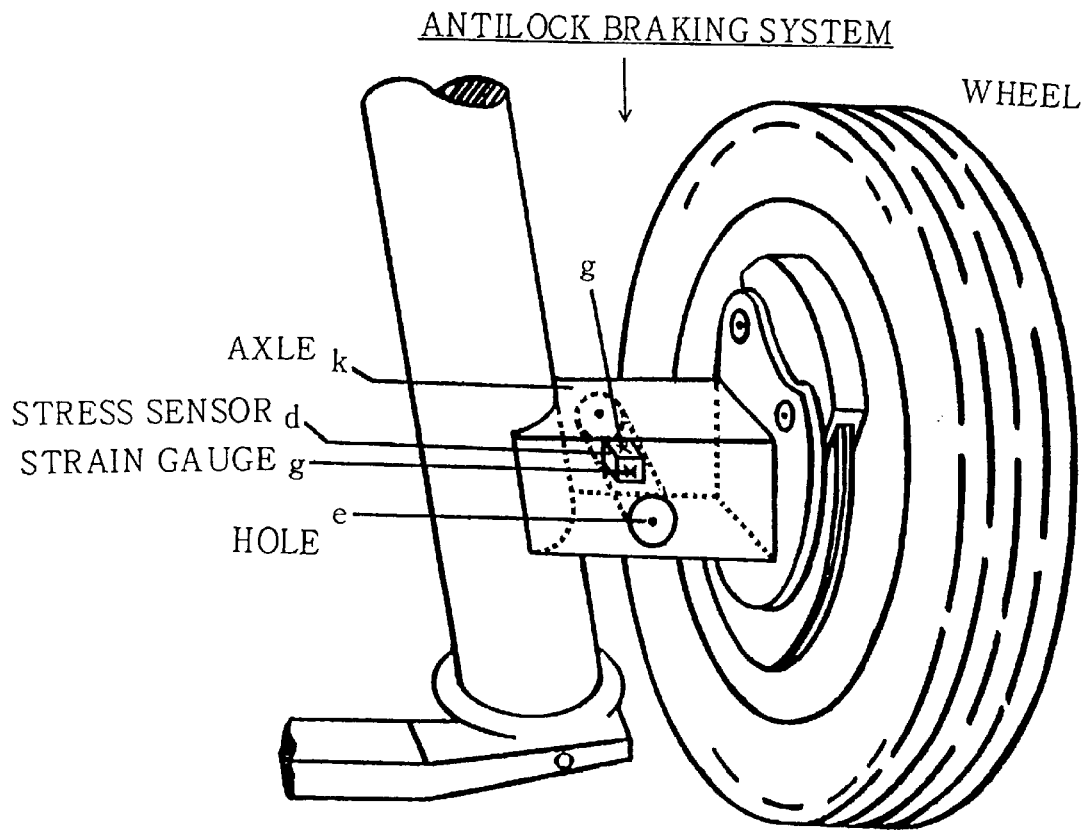
FIG. 1 is a schematic perspective view illustrating the essential portion of an example of an embodiment of an antilock braking system, in which a stress sensor is installed in the wheel axle of a vehicle, according to the present invention.

FIG. 1 shows an example of the antilock braking system in which the stress sensor d is installed in a hole e formed on the wheel axle k of a motor vehicle. The stress sensor d has been disclosed, for example, in Japanese Patent Laid-Open Publication No.4-331336. A structure of this stress sensor is disclosed in the Publication as follows: A bridge circuit is formed with strain gauges g using, for example, a plurality of metallic resistance wires by adhering them to cross at right angles to each other on the surface of a cube-like substrate which is comprised of materials such as epoxide resin, silicon, etc. An output terminal of the bridge circuit is connected to an input terminal of a signal processing circuit through an amplifier. Measured values Fs, Ns, $\mu$s, Ts, and Ss, representing the road surface frictional force F, the vertical load N, the road surface friction coefficient $\mu$, the braking torque T, and the side force S respectively, are given from the output terminal of the signal processing circuit.

Figure 2:
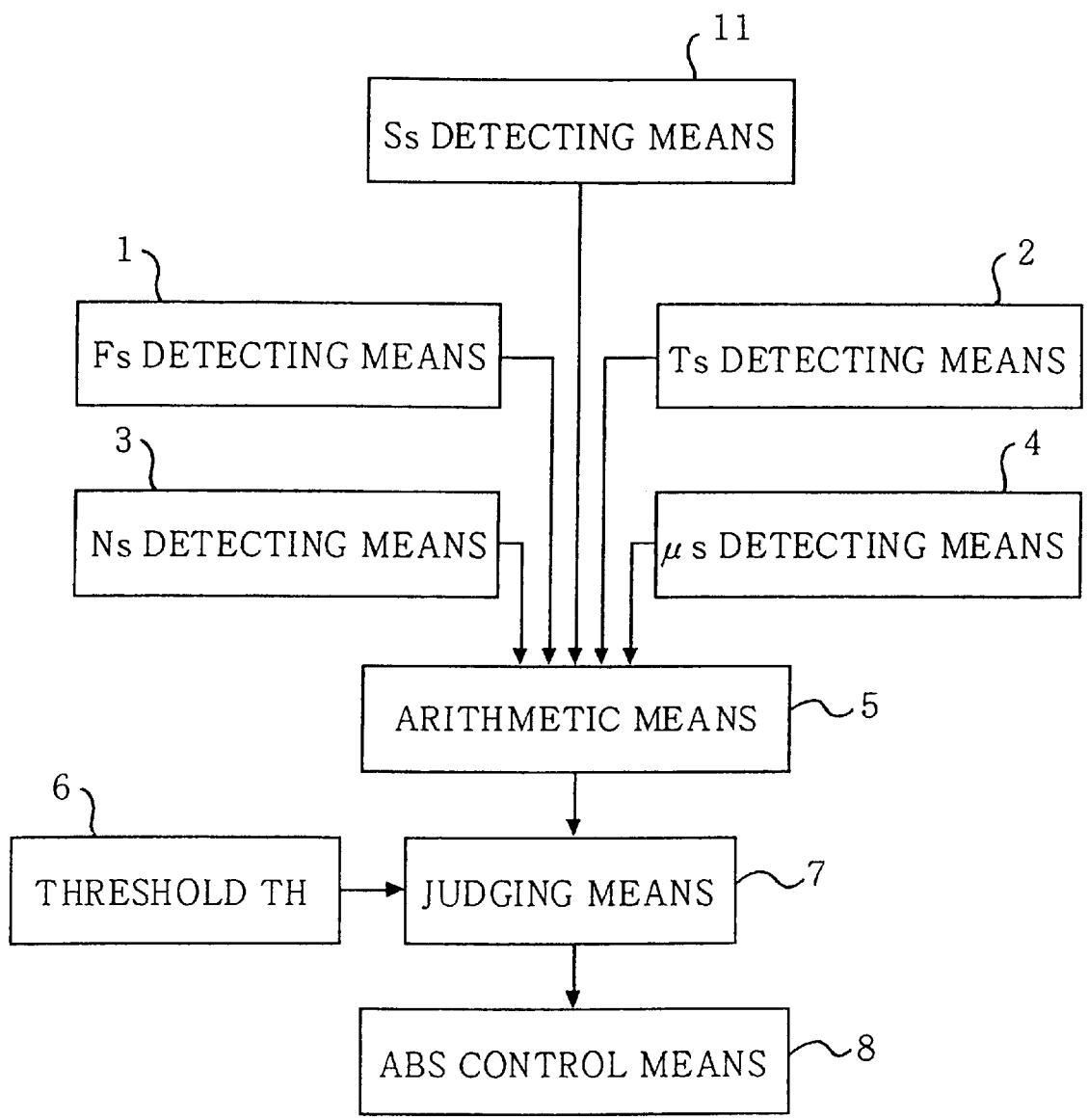
FIG. 2 is a block diagram illustrating the embodiment of an antilock braking system according to the present invention.
Figure 3:
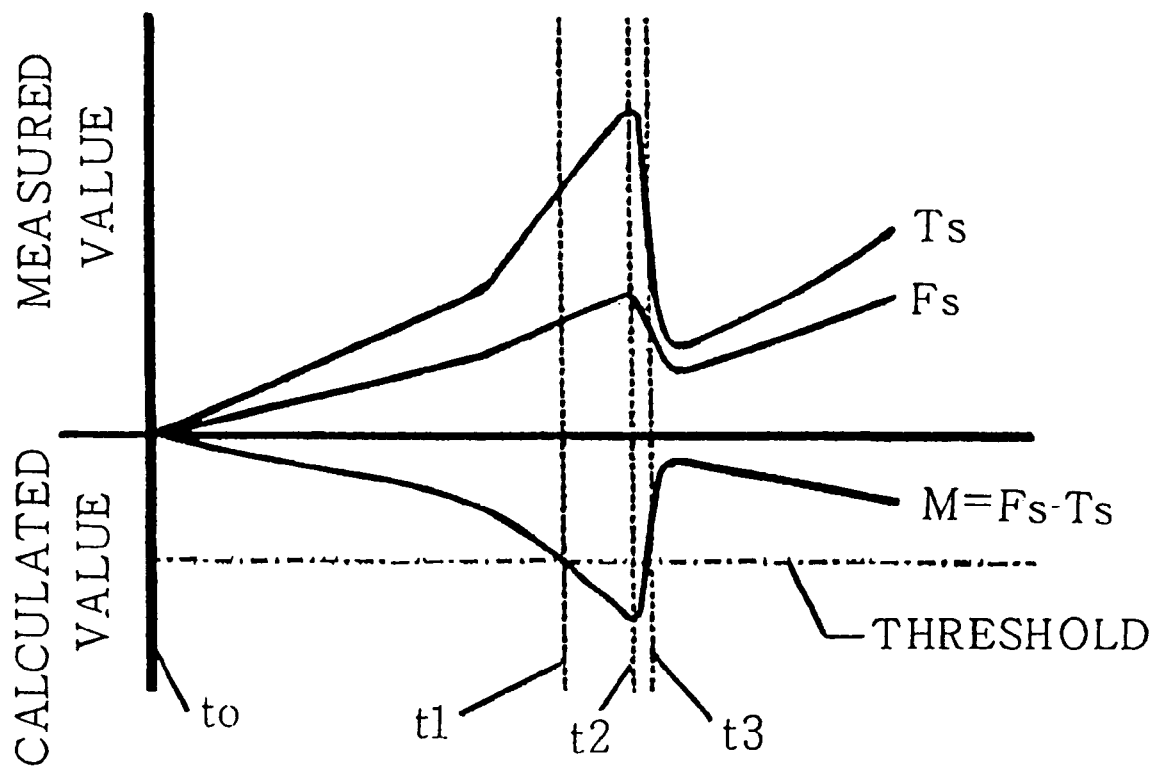
FIG. 3 is a graphical representation illustrating typical response values measured by the stress sensor, when the vehicle brake, of the embodiment of the antilock braking system according to the present invention is suddenly applied.

FIG. 2 is a block diagram representing the function of the embodiment of the antilock braking system according to the present invention. FIG. 3 is a graphical illustration representing a typical response of the measured road surface frictional force value Fs and the measured braking torque value Ts when braking of the motor vehicle is suddenly applied. FIG. 3 shows that Fs and Ts are continuously increased during a period in which the road surface has sufficient frictional force (short period after the brake force application), after sudden application of the brake at the time $t_o$. during this period, a value M, given by equation M=Fs−Ts, monotonously decreases with the passage of time. When the derivative of the road surface frictional force with respect to t approaches zero, Ts keeps increasing, but the rate of increase in Fs decreases in accordance with the decrease in the road surface frictional force. Therefore, the rate of decreases in the value M also decreases (in proximity to the time $t_2$). Thereafter, at the time $t_3$, at which the road surface frictional force exceeds a certain limit by the increase of brake pressure, Fs and Ts decrease rapidly while the value M increases rapidly. This period represents an initial state, reaching a time when the wheel of the motor vehicle is locked.

With reference to FIG. 2, the operation of this embodiment is explained. An arithmetic means 5 calculates the value M from Fs, Ts, Ns, and $\mu$s detected by detecting means 1, 2, 3, and 4. Fs, Ts, Ns, and $\mu$s are the measured values of the road surface frictional force F, the braking torque T, the vertical load N, and the road surface friction coefficient $\mu$ produced as outputs from the stress sensor d comprising the strain gauge, the amplifier, and the signal processing circuit as mentioned above. Judging means 7 monitors the change in the value M immediately before wheel braking. An ABS control means 8 controls movement process toward a braking pressure reduction mode in accordance with the change in the value M in such a way that the road surface frictional force F is kept in the vicinity of the peak thereof. In this way, control for antilock braking systems is achieved where no wheel locking is caused.

Fs is given by the equation Fs=Ns$\mu$s. Therefore, if the value M, given by the equation M=Ns$\mu$s−Ts, is calculated by the arithmetic means 5 and the change in the value M is monitored by the judging means 7, the ABS control means 8 operates similarly to one as mentioned above.

Similarly, the following method allows the realization of the antilock braking system without the wheel locking. If a differential coefficient dFs/dt, which is the derivative of the measured value of the road surface frictional force with respect to t, is calculated by the arithmetic means 5 instead of the calculation of the value M and a time, at which the differential coefficient dFs/dt reaches zero or near zero, is detected by the judging means 7, then the ABS control means 8 acts in such a way as to reduce suitably the brake pressure.

Fs is in a relationship proportional to the measured road surface friction coefficient $\mu$s. Therefore, if a differential coefficient d$\mu$s/dt, which is the derivative of the measured value of the road surface friction coefficient $\mu$s with respect to t, is calculated by the arithmetic means 5 instead of the differential coefficient dFs/dt and a time, at which the differential coefficient d$\mu$s/dt reaches zero or near zero, is detected by the judging means 7, the ABS control means 8 can also control movement process toward a braking pressure reduction mode in such a way that wheel locking does not occur.

The measured road surface frictional force value Fs reaches its peak at the time $t_2$. The condition of the region around the time $t_2$ is remarkably unstable because locking of the vehicle wheel is apt to occur in this region due to a slight change of the brake pressure, etc. For stabilizing purposes, it is desirable to set the start time $t_1$ for the control before the time $t_2$. The setting of the time $t_1$ is as follows: The arithmetic means 5 calculates the value M given by equation M1=Fs−Ts or M2=Ns$\mu$s−Ts. The judging means 7 compares the value M with a predetermined threshold TH. Then, the ABS control means 8 starts the braking pressure reduction process at the time $t_1$ at which the value M has become more than the threshold TH. This threshold TH is adjusted into the value, at which the most stable control action is obtained a driving test.

The road surface frictional force F changes momentarily in accordance with the condition of the road surface. For stabilizing purposes, it is desirable to adjust the threshold TH in response to changes in the road surface frictional force. Since the peak value of the measured road surface frictional force value Fs varies in accordance with the magnitude of the road surface frictional force, it is possible to provide a plurality of threshold levels according to the peak value of the measured road surface frictional force value Fs. By step-wise switching a plurality of threshold levels or using the floating threshold levels, the optimum start time for the pressure reduction process can be selected. Such methods secure the stable operation of antilock braking systems. Furthermore, the threshold level TH can also be varied continuously in accordance with the magnitude of the peak of the measured road surface frictional force value Fs. This method makes precise antilock braking operation possible.

It is well known that the road surface friction coefficient $\mu$ decreases as the motor vehicle speed is increased and that the friction coefficient $\mu$ increases as the speed is decreased. Therefore, the measured road surface frictional force value Fs becomes progressively greater as the motor vehicle speed is decreased after the braking application. Accordingly, the value M becomes greater. This means that the optimum start point for the pressure reduction process can be determined by compensating the threshold level TH in accordance with the change of the vehicle speed. It makes possible the provision of excellent antilock braking systems.

Figure 4:
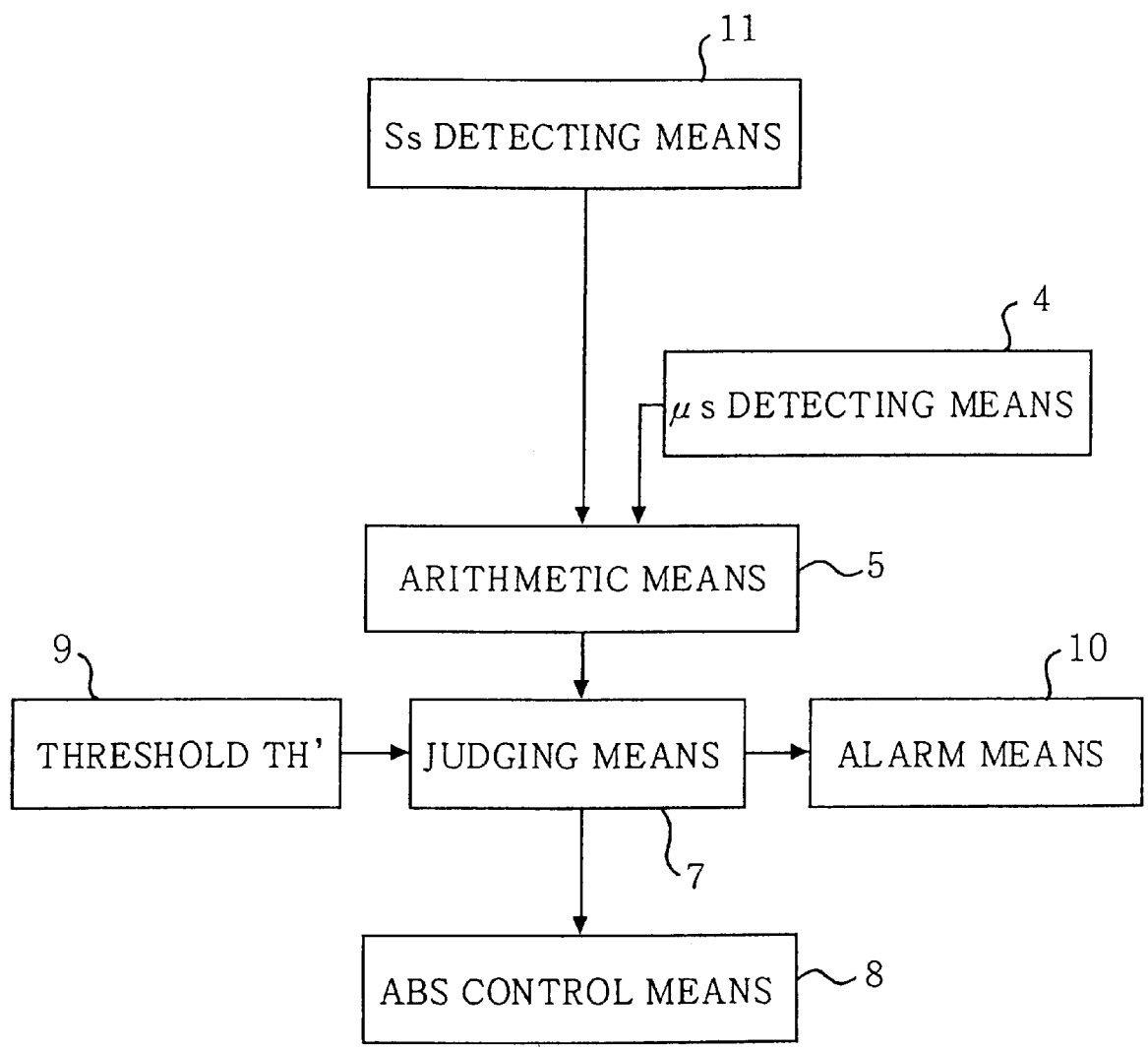
FIG. 4 is a block diagram illustrating another embodiment of an antilock braking system according to the present invention.

It is desirable to conduct the stable control of the antilock braking system when sudden application of the brake takes place during cornering. As shown in FIG. 4, the measured side force value Ss perpendicular to the direction of wheel travel is detected by the detecting means 11, being calculated by the arithmetic means 5. The judging means 7 compares the measured value Ss with a threshold TH', judging a point, at which the measured value Ss reaches the threshold TH'. Then the ABS control means 8 starts the movement process toward the braking pressure reduction mode in antilock braking systems.

As the road surface friction coefficient changes in accordance with the condition of the road surface, it is desirable to adjust the threshold TH' gradually or continuously in accordance with the variation of the measured value $\mu$s supplied from the detecting means 4. Thereby, it is possible to keep the antilock braking systems stable even during cornering. Furthermore, alarm means 10 as shown in FIG. 4 indicates the fact that the side force reaches the predetermined threshold value. Many conventional devices such as a sound unit, a lighting unit, a display apparatus, etc., can be used as the alarm means.

The present invention may be embodied in other specific forms without departing from the original purpose or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A control method for controlling the release timing of the brake pressure in antilock braking systems for motor vehicles by processing a measured value of at least one stress sensor in an arithmetic means, said method comprising the steps of:

sampling a measured value Fs of road surface frictional force between a road surface and a wheel of the motor vehicle, a measured value Ts of braking torque applied on the wheel from the stress sensor respectively;

calculating a parameter M=Fs−Ts from said sampled value; and monitoring a calculated value of said parameter M from the time when a braking pressure is applied on the wheels to release the braking pressure when the calculated value of said parameter M reaches a prepared threshold TH.

2. The control method for antilock braking systems according to claim 1, wherein said predetermined threshold TH is changed step-wise in accordance with the magnitude of a peak value of said measured value Fs of a road surface frictional force sampled from the stress sensor.

3. The control method for antilock braking systems according to claim 1, wherein said predetermined threshold TH is changed continuously in accordance with the magnitude of a peak value of said measured value Fs of a road surface frictional force sampled from the stress sensor.

4. A control method for antilock braking systems for controlling the release timing of the brake pressure for motor vehicles by processing a measured value of at least one stress sensor in an arithmetic means, said method comprising the steps of:

sampling a measured value Ts of braking torque applied on the wheels, a measured value Ns of a vertical load of the motor vehicle, and a measured value $\mu$s of a road surface friction coefficient between a road surface and the wheel of the motor vehicle from the stress sensor respectively;

calculating a parameter M=Ns×$\mu$S−Ts from said sampled values; and monitoring a calculated value of said parameter M from the time when a braking pressure is applied on the wheels to release the braking pressure when the calculated value of the parameter M reaches a prepared threshold TH.

5. The control method for antilock braking systems according to claim 4, wherein said predetermined threshold TH is changed step-wise in accordance with the magnitude of a peak value of said measured value $\mu$s of a road surface friction coefficient sampled from the stress sensor.

6. The control method for antilock braking systems according to claim 4, wherein said predetermined threshold TH is changed continuously in accordance with the magnitude of a peak value of said measured value $\mu$s of a road surface friction coefficient sampled from the stress sensor.

7. A control method for antilock braking systems for controlling the release timing of the brake pressure for motor vehicles by processing a measured value of at least one stress sensor in an arithmetic means, said method comprising the steps of:

sampling a measured value Fs of road surface frictional force between a road surface and a wheel of the motor vehicle by using the stress sensor;

calculating a differential coefficient dFs/dt of a road surface frictional force from said values; and monitoring said differential coefficient dFs/dt of a road surface frictional force from the time when a braking pressure is applied on the wheels to release the braking pressure when dFs/dt becomes zero.

8. A control method for antilock braking systems for controlling release timing of brake pressure of motor vehicles by processing a measured value of at least one stress sensor in an arithmetic means, said method comprising the steps of:

sampling a measured value $\mu$s of a road surface friction coefficient between a road surface and a wheel of the motor vehicle by using the stress sensor;

calculating a differential coefficient d$\mu$s/dt of a road surface friction coefficient from said values; and monitoring said differential coefficient d$\mu$s/dt of a road surface frictional coefficient from the time when a braking pressure is applied on the wheels to release the braking pressure when d$\mu$s/dt becomes zero.

9. A control method for antilock braking systems for controlling release timing of brake pressure of motor vehicles by processing a measured value of at least one stress sensor in an arithmetic means, said method comprising the steps of:

sampling a measured value Ss of side force and a measured value $\mu$s of a road surface friction coefficient between a road surface and a wheels of the motor vehicle using the stress sensor;

specifying a threshold value TH corresponding to the measured value $\mu$s of road surface friction coefficient sampled from the stress sensor from a plural threshold data prepared in advance according to the measured value $\mu$s; and comparing said measured value Ss and said specified threshold value TH every time said measured value Ss is sampled from the stress sensor, to release the braking pressure when said measured value Ss reaches said threshold value TH in the comparing step.

10. The control for antilock braking systems according to claim 9, said method further comprising the step of: informing the fact that said measured value Ss of said side force reaches said threshold value TH specified in accordance with said measured value $\mu$s of road surface friction coefficient sampled from the stress sensor in said comparing step.

* * * * *